March 25, 1947.  A. C. KELLER  2,417,829
COMPRESSIONAL WAVE SIGNALING DEVICE
Filed Dec. 31, 1942   2 Sheets-Sheet 1

INVENTOR
A. C. KELLER
BY
Walter C. Kiesel
ATTORNEY

March 25, 1947.                A. C. KELLER                2,417,829
                  COMPRESSIONAL WAVE SIGNALING DEVICE
                   Filed Dec. 31, 1942        2 Sheets-Sheet 2

INVENTOR
A. C. KELLER
BY
Walter C. Kiesel
ATTORNEY

Patented Mar. 25, 1947

2,417,829

UNITED STATES PATENT OFFICE 2,417,829

COMPRESSIONAL WAVE SIGNALING DEVICE

Arthur C. Keller, Bronxville, N. Y., assignor to Bell Telephone Laboratories, Incorporated, New York, N. Y., a corporation of New York Application December 31, 1942, Serial No. 470,807

6 Claims. (Cl. 177—386)

This invention relates to compressional wave submarine signalling devices and more particularly to such devices of the piezoelectric crystal array type especially suitable for use in supersonic ranging systems.

Submarine signaling devices of one known type comprise, in general, a sound translating element mounted within a housing adapted to be submerged and capable of transmitting compressional wave energy, the housing having a filling of a fluid having substantially the same impedance to compressional wave energy characteristic as sea water. In one known construction, the translating element comprises a plurality of piezoelectric crystals mounted in linear array upon a support fixed in the housing.

The sensitivity and directional characteristics of such devices are dependent upon a number of factors. For a given sound translating element, both the sensitivity and directional pattern are dependent largely upon the housing material and construction and upon the character of the transmission of energy between the housing and the element. The housing material and construction are important not only because of the impedance presented to the transmission of compressional wave energy but also, it has been found, because of the possible variation of the transparency of the housing to supersonic waves with angle of incidence of the waves upon the housing. The character of the transmission of energy between the housing and the sound translating element is important because, inasmuch as the wavelengths of supersonic waves in sea water and similar media are extremely short, noncophasic incremental pressures upon the element, such as might be produced by reflection within the housing, materially affect the sensitivity and directional pattern.

The effects of the housing and the transmission between it and the element upon the directional characteristics are of particular and major moment in devices wherein a definite directivity pattern is essential for satisfactory operation. For example, in echo ranging equipment utilized as a proximity fuse to control the detonating mechanism in a depth charge, the signaling device, which is mounted on the depth charge, should be highly and uniformly sensitive to waves in a horizontal plane for all angles of incidence and should be very slightly sensitive to waves in all planes beyond a few degrees to the horizontal plane, the horizontal plane being considered as normal to the direction of travel of the depth charge.

One general object of this invention is to improve the sensitivity and directional characteristics of compressional wave submarine signaling devices. More specifically, objects of this invention are to:

Achieve a definite prescribed directivity pattern for submarine signaling devices;

Obtain efficient transmission of compressional wave energy through the housing of a submarine signaling device, with negligible directional discrimination; and Prevent reflection effects within the housing of such devices.

In one illustrative embodiment of this invention, a submarine signaling device comprises an elongated housing, a supporting plate within and extending lengthwise of the housing, and two rows of piezoelectric crystals mounted upon opposite faces of the supporting plate, the housing having a filling of viscous fluid, such as castor oil.

In accordance with one feature of this invention, means are provided for preventing reflection of waves from the supporting plate, whereby distortion of the directional pattern of the device by reflection and interference effects is minimized. In one specific form, this means comprises a plurality of fine mesh metallic screens disposed immediately adjacent the sides of each row of crystals and overlying the supporting plate.

In accordance with another feature of this invention, the housing is constructed so that not only is it capable of safely withstanding the great forces to which it is subjected during use of the device but also it has substantially the same velocity of propagation characteristic for compressional wave energy as sea water and exhibits substantially no variation in transmission sensitivity with angle of incidence of the compressional waves thereon. In one specfic form, the housing comprises a rigid openwork metallic frame, the openings in which constitute of the order of 75 per cent of the total area, and a covering of very thin, e. g. of the order of 20 mils thick, sheet steel upon the frame and fixedly secured thereto, as by welding.

The invention and the above-noted and other features thereof will be understood more clearly and fully from the following detailed description with reference to the accompanying drawing in which.

Figure 1:
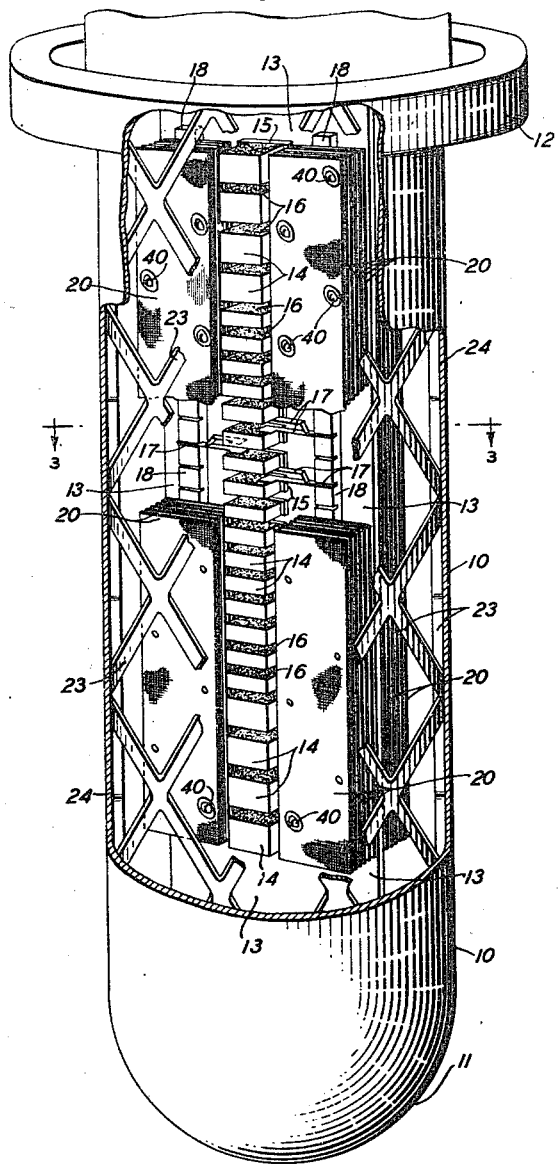
Fig. 1 is a perspective view of a submarine signaling device illustrative of one embodiment of this invention, a portion of the housing being broken away to show the translating element and a portion of the element being broken away to show details of construction.

Referring now to the drawings, the submarine signaling device illustrated therein is of the crystal array type and is adapted for use as a supersonic transceiver, for example, for operation at 100 kilocycles. It comprises a fluid-tight housing, filled with a highly viscous liquid, such as castor oil, not shown, and having a cylindrical body portion 10 and a domed or generally hemispherical end portion 11, the housing being secured to a mounting member 12 by which it may be supported, as, for example, upon the casing of a depth bomb.

Figure 2:
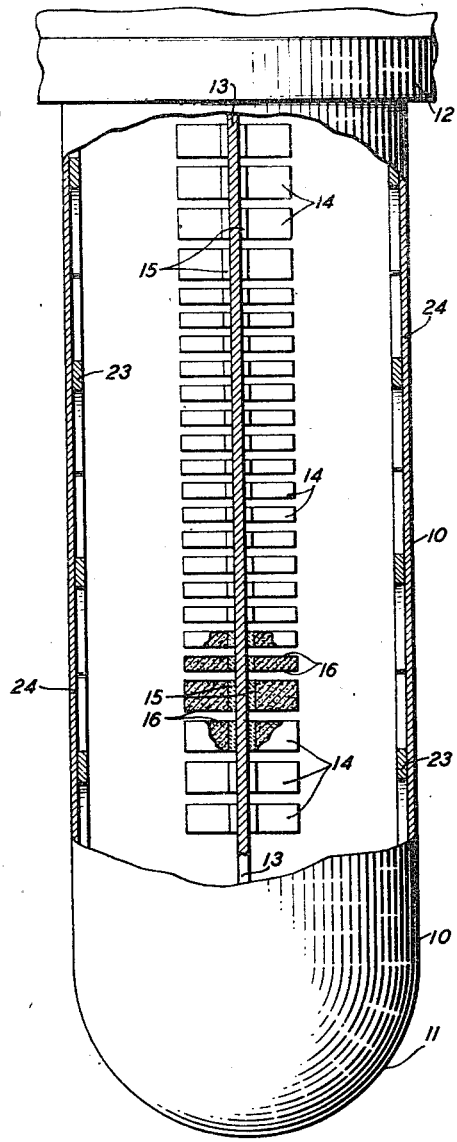
Fig. 2 is a side elevational view of the device shown in Fig. 1, a portion of the housing being broken away, and with the screens and leading-in conductors for the crystals removed.
Figure 3:
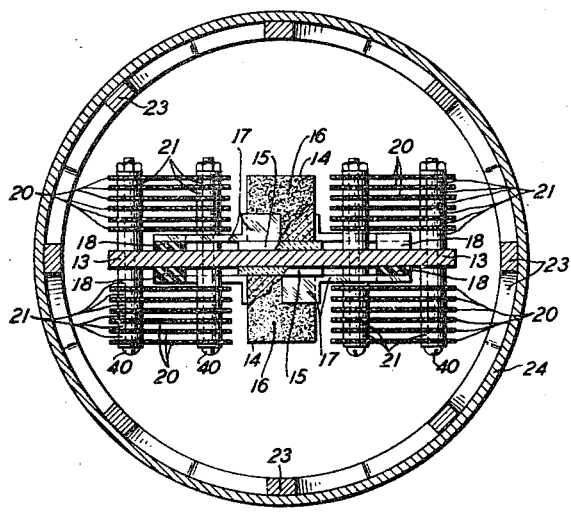
Fig. 3 is a cross-sectional view of the signaling device, taken along plane 3—3 of Fig. 1.

Fixedly supported by the mounting member 12 and extending lengthwise of the housing 10 is a rigid supporting plate 13, for example of steel, which, as shown in Figs. 2 and 3 lies in a diametral plane of the housing. Two similar rows of piezoelectric crystals 14 are arrayed on opposite faces of the supporting plate 13, the crystals being insulated from the plate 13 by insulating spacers 15, such as strips of ceramic having a low dielectric constant, which are secured to the plate and crystals by a cement also having a low dielectric constant. Although individual strips 15 are shown for each crystal, longer strips common to several crystals may be employed.

The crystals 14 may be 45 degree Y cut Rochelle salt blocks each of a height of one-quarter wave-length of the operating frequency, the height being the dimension normal to the plate 13, and the crystals in each row are equally spaced with the distance between centers of adjacent crystals less than one-half the wave-length of the operating frequency. Of course, if the device is to be utilized for operation at frequencies within a prescribed band, the crystal height should be one-quarter the wave-length of the highest frequency in this band and the center-to-center spacing of adjacent crystals should be less than one-half this wave-length.

Figure 4:
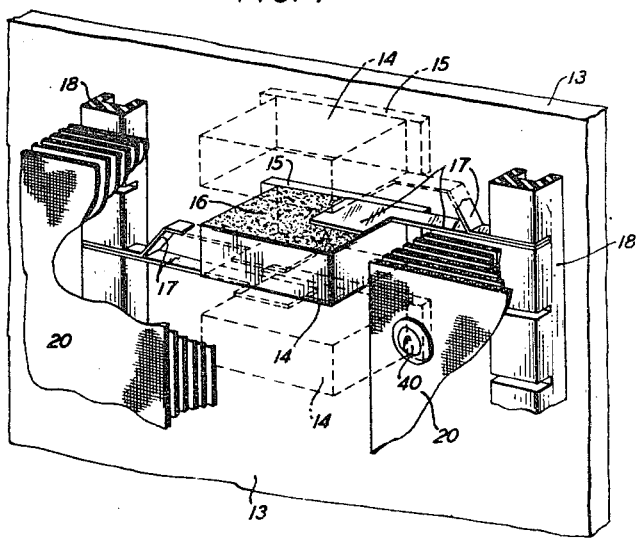
Fig. 4 is an enlarged fragmentary perspective view showing details of the construction and mounting of one of the piezoelectric crystals.
Figure 5:
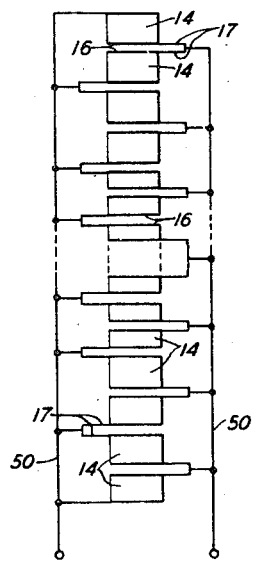
Fig. 5 is a circuit diagram illustrating one manner of electrically connecting the crystals in each of the rows to one another.

As illustrated clearly in Fig. 4, each of the crystal blocks is provided on two opposite faces, the upper and lower faces in Figs. 1 and 2, with a conductive coating or electrode 16, which may be a layer of gold evaporated on to the faces, and leading-in conductors 17, for example, gold-plated foil strips secured to the coatings 16. The conductors 17 extend outwardly to terminals, not shown, mounted on insulating terminal strips 18 positioned on opposite sides of the rows of crystals and secured to the supporting plate 13. As illustrated in Figs. 1 and 4, the conductors 17 extending from juxtaposed faces of adjacent crystals are connected to the same terminal whereby capacitance effects between adjacent crystals are minimized. All the crystals in the two rows are connected electrically in parallel, as shown in Fig. 5, by conductors 50, to provide a relatively high power capacity for the device, the crystals being so oriented, of course, that the output of the several crystals is cumulative. The conductors 50 are suitably insulatingly brought out through the mounting member 12 to enable connection to associated apparatus, such as an amplifier.

As is known, a row of crystals, such as embodied in the device of this invention, exhibits a marked directivity, that is, it is highly sensitive to wave energy incident thereon normal to the axis of alignment of the crystals and is relatively insensitive to waves incident at angles to this normal. Conversely, of course, the array is directional in the same manner when utilized for transmission. The sharpness of the directivity is enhanced, i. e., secondary lobes are reduced without increasing the main lobe width, by a grading of the impedance of the crystals from the center of each row to both ends, i. e., as shown in the drawing the four end blocks at each end of the rows are made of twice the thickness of the remaining crystals, the thickness being the dimension parallel to the axis of alignment of the crystals. The intermediate crystal blocks, therefore, are twice as sensitive as the end blocks as regards amplitude, and, therefore, propagate or translate four times the power per block as the end blocks.

As pointed out heretofore, in some applications, it is highly desirable that the crystal array be uniformly sensitive to compressional waves in a plane normal to the longitudinal axis of the array, irrespective of the angle of incidence of the waves. Stated in another way, it is highly desirable that the response pattern be circular concentric with respect to the longitudinal axis of the crystal array. Theoretically, the two row array should provide essentially the circular sound pattern required. However, it has been found in actual devices that the desired pattern is approximated only and that the actual pattern comprises four similar broad lobes at right angles to one another.

This departure from the circular pattern, it has been found, is due to reflections from the supporting plate 13, which reflections produce increments of pressure adjacent the crystals, out of phase with the main pressures, the out-of-phase angle varying with angle of incidence of waves upon the plate. In accordance with one feature of this invention, such reflection effects are substantially eliminated whereby the required circular pattern is obtained.

As shown in Figs. 1 and 3, in one form the reflection eliminating means comprises groups of shields 20 mounted on the supporting plate 13, as by screws or bolts 40, and disposed in pairs adjacent and on opposite sides of the rows of crystals. The shields, in a particularly satisfactory construction, are fine mesh, for example 100 mesh, wire screens held in parallel, spaced relation by spacers 21, the spacing between adjacent screens being several times the thickness of each screen. In one construction, the screens may be of four mil wire and spaced 30 to 40 mils. As shown in the drawing, the outermost screen in each group advantageously is substantially coplanar with the outer faces of the adjacent crystals. The screens are highly absorbent to compressional wave energy and thus substantially eliminate reflections and the distortion of the pattern attributable to reflections.

In another form, not illustrated, the reflection shields are L-shaped metallic strips or baffles mounted on the supporting plate 13 and disposed on opposite sides of the rows of crystals, the outer face of the longer leg of each strip being substantially coplanar with the outer faces of the adjacent crystals.

The amplitude and directional pattern of the translation characteristic of the crystal array is dependent upon the transmission properties of the housing 10, 11. Realization of a high response level requires that the housing be highly transparent to supersonic waves and realization of the desired directivity pattern requires that the housing itself be essentially nondirective. Further, of necessity in devices adapted for underwater signaling, the housing must possess sufficient mechanical strength to withstand relatively great static pressures. In accordance with a feature of this invention, the housing is constructed to meet fully all these requirements and desiderata.

As illustrated in Figs. 1 and 3, the housing comprises a rigid framework 23 having large, for example, diamond shaped, openings. In a particularly advantageous construction, this framework is of stainless steel expanded metal, the openings constituting at least 60 per cent and preferably of the order of 75 per cent of the total area. Secured to the framework 23 is a thin stainless steel sheet 24, the sheet being of the order of 20 mils thick and welded to the expanded metal.

This housing construction, it has been found, provides an enclosure for the crystal array which is essentially uniformly transparent to compressional waves for all angles of incidence and which is highly transparent to supersonic compressional wave energy.

Figure 6:
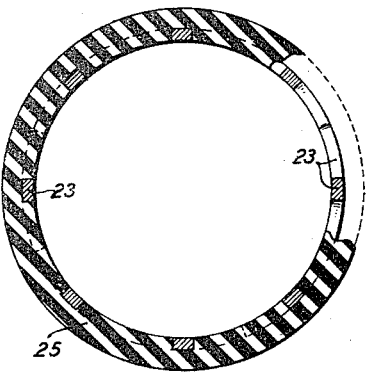
Fig. 6 is a cross-sectional view of a housing illustrative of a modification of the construction shown in Fig. 1.

In another construction illustrated in Fig. 6, the housing comprises an expanded metal framework 23 to which there is vulcanized a covering 25 of composition rubber substantially free of entrapped air pockets and having substantially the same velocity of propagation of compressional wave energy property as sea water.

Although specific embodiments of this invention have been illustrated and described, it will be understood, of course, that various modifications may be made therein. For example, although the invention has been described with particular reference to crystal devices, features thereof may be embodied also in devices including an array of magnetostrictive elements. Other modifications may be made without departing from the scope and spirit of this invention as defined in the appended claims.

What is claimed is:

1. A compressional wave signaling device comprising a supporting member, a row of piezoelectric crystals adjacent and mounted on said member, said member having portions laterally beyond said crystals, and mesh screens on opposite sides of said row of crystals and overlying said portions of said member.

2. A compressional wave signaling device comprising a supporting plate, two similar rows of piezoelectric quadrangular prism crystals mounted on opposite faces of said plate, said crystals extending forwardly beyond the respective face of said plate and having their ends parallel thereto, one end of each crystal being affixed to said plate, said plate having portions extending laterally beyond said crystals, and means for shielding the sides of said crystals from reflections of compressional waves incident upon said portions comprising compressional wave energy absorbing members extending laterally outwardly from immediately adjacent the sides of said crystals and overlying said portions.

3. A compressional wave signaling device comprising a housing transparent to supersonic compressional waves and having a viscous liquid filling, a supporting plate within said housing, two rows of piezoelectric crystals mounted on said plate, said rows being adjacent opposite faces of said plate and said faces extending laterally beyond each of said rows, and reflection shielding means on opposite sides of each of said rows, said means comprising groups of spaced, superposed fine mesh screens, each group being adjacent one face of said plate and laterally adjacent one row of crystals.

4. A submarine signaling device comprising signal translating means, and a housing for said means, said housing including a rigid openwork framework, the openings in which constitute of the order of 75 per cent of the total area, and a covering on said framework of a sheet of material having substantially the same velocity of propagation of compressional wave energy constant as sea water.

5. A submarine signaling device comprising signal translating means, and a housing for said means including a framework of expanded metal the openings in which constitute of the order of 75 per cent of the total area, and a covering of sheet steel substantially 20 mils thick for said framework and secured thereto.

6. A submarine signaling device comprising signal translating means, and a housing for said means including a framework of expanded metal the openings in which constitute of the order of 75 per cent of the total area, and a covering over said framework comprising a sheet of rubber vulcanized thereto, the rubber having substantially the same velocity of propagation of compressional wave constant as sea water.

ARTHUR C. KELLER.

REFERENCES CITED

The following references are of record in the file of this patent:

UNITED STATES PATENTS

| Number | Name | Date |
| --- | --- | --- |
| 768,568 | Mundy | Aug. 23, 1904 |
| 1,101,830 | Berger | June 30, 1914 |
| 1,836,397 | Rieber | Dec. 15, 1931 |
| 2,147,649 | Haines | Feb. 21, 1939 |
| 2,009,451 | Kunze | July 30, 1935 |
| 2,105,010 | Sawyer | Jan. 11, 1938 |
| 1,599,541 | Nyman | Sept. 14, 1926 |

FOREIGN PATENTS

| Number | Country | Date |
| --- | --- | --- |
| 301,034 | British | Feb. 21, 1930 |
| 304,173 | British | Feb. 14, 1929 |

Disclaimer 2,417,829.—*Arthur C. Keller*, Bronxville, N. Y. COMPRESSIONAL WAVE SIGNALING DEVICE. Patent dated Mar. 25, 1947. Disclaimer filed Dec. 23, 1948, by the assignee, *Bell Telephone Laboratories, Incorporated.*
Hereby enters this disclaimer to claim 4 of said patent.
[*Official Gazette January 25, 1949.*]